United States Patent
Kopecek

(10) Patent No.: US 8,932,176 B2
(45) Date of Patent: Jan. 13, 2015

(54) LINEAR ACTUATOR AND METHOD OF OPERATION THEREOF

(71) Applicant: Woodward HRT, Inc., Valencia, CA (US)

(72) Inventor: Joseph Thomas Kopecek, Santa Clarita, CA (US)

(73) Assignee: Woodward HRT, Inc., Valencia, CA (US)

( * ) Notice: Subject to any disclaimer, the term of this patent is extended or adjusted under 35 U.S.C. 154(b) by 0 days.

(21) Appl. No.: 14/174,229

(22) Filed: Feb. 6, 2014

(65) Prior Publication Data

US 2014/0216248 A1 Aug. 7, 2014

Related U.S. Application Data

(62) Division of application No. 12/983,042, filed on Dec. 31, 2010, now Pat. No. 8,715,132.

(51) Int. Cl.
*F15B 15/26* (2006.01)
*F02K 1/76* (2006.01)

(52) U.S. Cl.
CPC .............. *F15B 15/26* (2013.01); *F02K 1/763* (2013.01); *F02K 1/766* (2013.01); *F05D 2260/57* (2013.01); *F15B 15/261* (2013.01)
USPC ................ 475/329; 92/23; 74/89.39

(58) Field of Classification Search
USPC ................ 74/89.39; 92/23; 475/329
See application file for complete search history.

(56) References Cited

U.S. PATENT DOCUMENTS

| 2,434,828 | A | * | 1/1948 | Ashton et al. | 92/21 MR |
|---|---|---|---|---|---|
| 2,970,573 | A | * | 2/1961 | Geyer | 92/17 |
| 4,240,332 | A | * | 12/1980 | Deutsch | 92/5 L |
| 4,463,661 | A | * | 8/1984 | Tootle | 92/17 |
| 4,470,340 | A | * | 9/1984 | Goans et al. | 92/29 |
| 4,603,594 | A | * | 8/1986 | Grimm | 74/89.39 |
| 4,703,683 | A | * | 11/1987 | Sue | 92/24 |
| 4,742,758 | A | * | 5/1988 | Della Rocca | 92/24 |
| 4,785,718 | A | * | 11/1988 | Hata et al. | 92/29 |
| 5,267,760 | A | * | 12/1993 | Carlin | 292/19 |
| 2006/0111192 | A1 | * | 5/2006 | Bae | 464/35 |
| 2007/0220998 | A1 | * | 9/2007 | Kopecek | 74/89.39 |

FOREIGN PATENT DOCUMENTS

| FR | 2526900 | 11/1983 |
|---|---|---|
| GB | 2120332 | 11/1983 |
| GB | 2435877 | 9/2007 |

OTHER PUBLICATIONS

Search Report and Written Opinion from corresponding EP Application No. 11194921.0, Jun. 6, 2012.

* cited by examiner

*Primary Examiner* — Derek D Knight
(74) *Attorney, Agent, or Firm* — Fish & Richardson P.C.

(57) ABSTRACT

A method of locking a linear output member in a retracted position within a linear actuator, where the linear output member is capable of axial motion within a housing of the linear actuator, includes rotating a generally tubular rotor disposed within a rotary lock assembly of the actuator to a first rotor position, and shifting a lock capable of radial displacement within the rotary lock assembly based on rotating the rotor to the first position. The lock engages a radial groove of the linear output member when the linear output member is in a retracted position. The rotary lock assembly is constrained from axial motion. The radial groove of the linear output member includes an axially angled, substantially planar surface. The lock is configured to include an axially angled surface shaped complimentary to the axially angled, substantially planar surface of the radial groove.

9 Claims, 13 Drawing Sheets

LINEAR ACTUATOR AND METHOD OF OPERATION THEREOF

This application is a divisional of and claims the benefit of priority to U.S. patent application Ser. No. 12/983,042, filed Dec. 31, 2010 and entitled "Linear Actuator and Method of Operation Thereof", the contents of which are incorporated herein by reference.

BACKGROUND OF THE INVENTION

1. Field of the Invention

The present disclosure relates generally to linear actuators. More particularly, aspects of the disclosed embodiments relate to linear actuators that can be locked in position.

2. Description of Related Art

Conventional linear actuators have output rams that may be driven from a rotary source or with pneumatic or hydraulic pressure. The actuator may have a lock mechanism to retain the output in a fixed position. Known lock mechanisms, such as taught by Tootle in U.S. Pat. No. 4,463,661, engage an actuator synchronization system, and therefore provide only indirect locking to the output ram. Direct locking mechanisms that employ a linear actuator have been developed and typically include a multi-piece housing with increased size and mass. Such actuators include tine locks, an example of which is disclosed by Carlin in U.S. Pat. No. 5,267,760. While some tine lock arrangements may allow for a single-piece housing actuator, they have the disadvantage of using flexing lock element with consequential fatigue considerations. Locking Actuators can be operated by a rotary source rather than hydraulically or pneumatically. Present rotary source operated actuators, such as disclosed by Grimm in U.S. Pat. No. 4,603,594, have the disadvantage of requiring an electrically operated solenoid mechanism (or other mechanical input separate from the rotary source) to unlock the actuator lock before motion of the ram can commence. Ball Lock mechanisms such as taught by Sue in U.S. Pat. No. 4,703,683, Deutch in U.S. Pat. No. 4,240,332, and Della Rocca in U.S. Pat. No. 4,742,758 have the disadvantage of a low external load carrying capability of the ram because of the point contact stresses imposed on the lock balls. Linear motion lock sleeve and key arrangements, such as disclosed by Kopecek (the inventor of the present disclosure) in UK patent GB2435877, include a rotary-to-linear motion conversion mechanism for the lock sleeve and complexity associated therewith. Accordingly, it would be desirable to provide a linear actuator arrangement that overcomes at least some of the problems identified above.

BRIEF DESCRIPTION OF THE INVENTION

As described herein, the exemplary embodiments overcome one or more of the above or other disadvantages known in the art.

One aspect of the disclosed embodiments relates to a linear actuator. The linear actuator includes a housing, a linear output member, and a rotary lock assembly. The linear output member includes a radial groove and is axially movable from a retracted position within the housing. The rotary lock assembly is constrained from axial motion within the housing and includes a rotor and a lock. The rotor is capable of axial rotation from a first to a second position. When the linear output member is in the retracted position, the rotor surrounds the radial groove. When the rotor rotates to the first position, the lock engages the radial groove with radially moving lock keys and prevents axial motion of the output member from the retracted position.

Another aspect of the disclosed embodiments relates to a method of locking a linear output member capable of axial motion in a retracted position within a housing of a linear actuator. The method includes rotating a rotor disposed within a rotary lock assembly constrained from axial motion to a first rotor position. The method further includes shifting a lock key within the rotary lock assembly as the rotor rotates to the first rotor position.

A further aspect of the disclosed embodiments relates to a linear actuator including a housing, a linear output member, a rotor, and a lock. The linear output member includes a radial groove and is axially movable from a retracted position within the housing. The rotor is disposed within the housing surrounding and coaxial with the linear output member. The lock is disposed within a bore of the rotor, and is responsive to rotation of the rotor to a first rotor position to engage and be restrained within the radial groove of the linear output member.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE
EXEMPLARY EMBODIMENTS OF THE
DISCLOSURE

Figure 1:
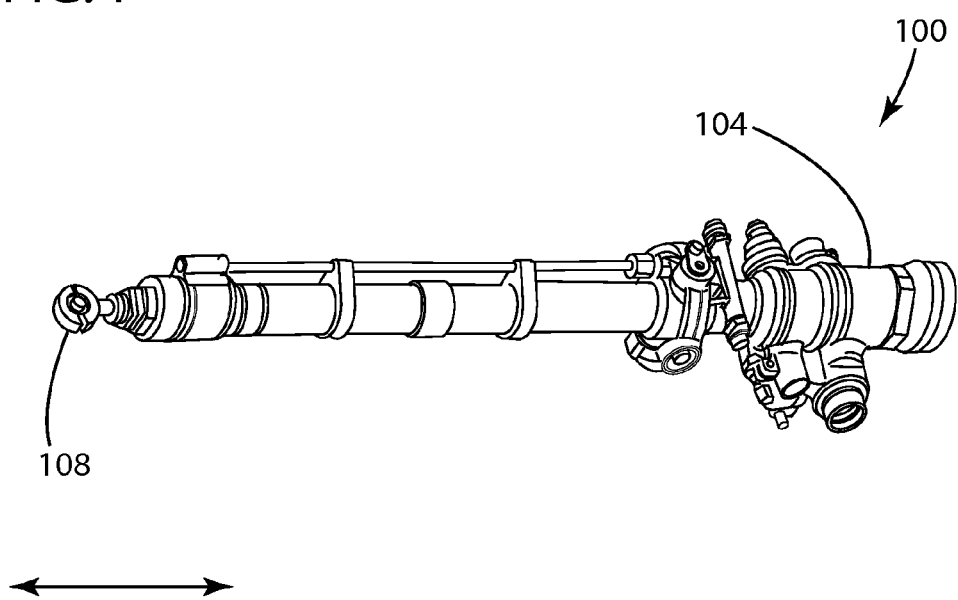
FIG. 1 depicts a front perspective view of a linear actuator in accordance with an embodiment of the present disclosure.
Figure 2:
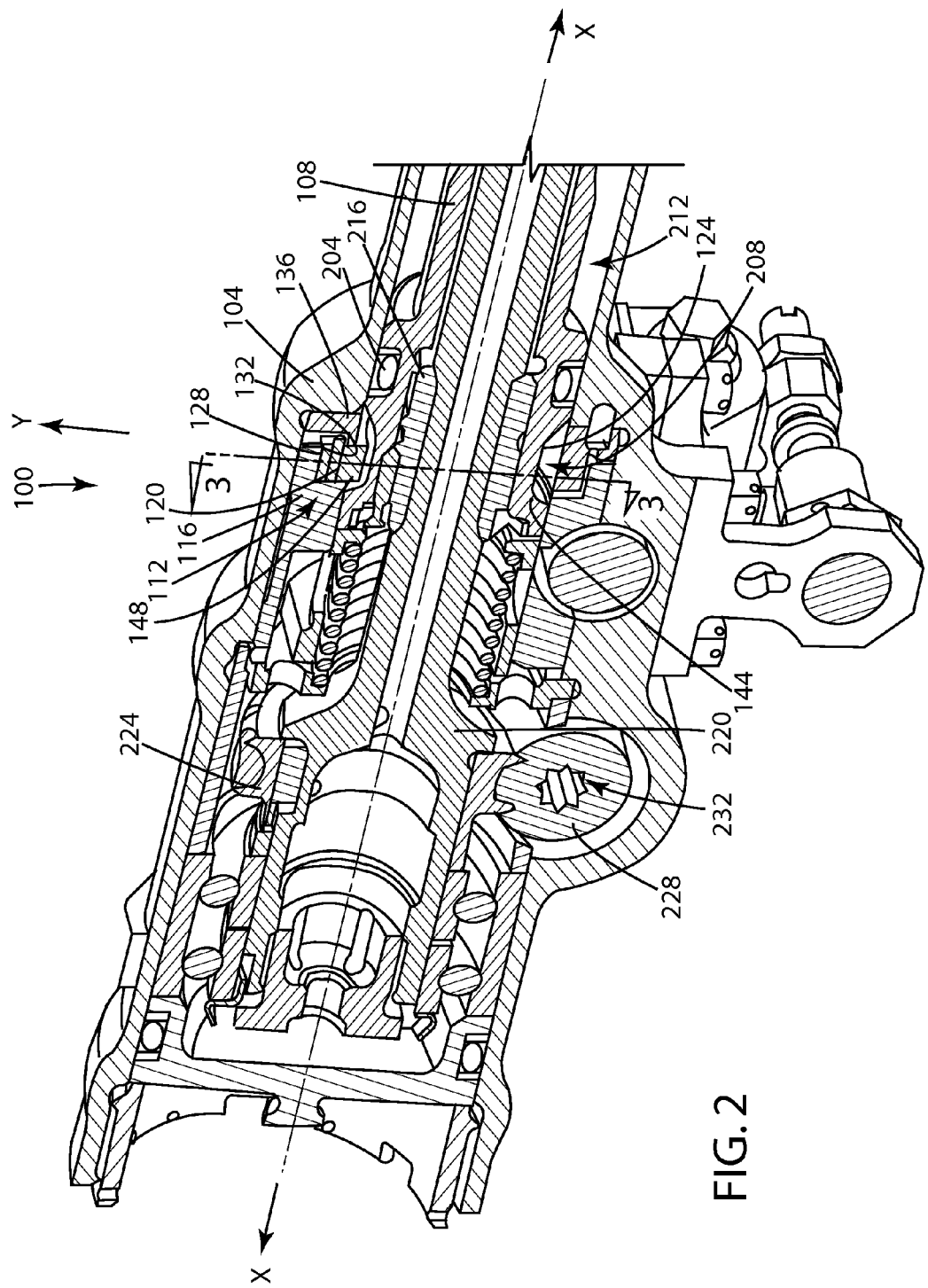
FIG. 2 depicts a front perspective cross section view of a linear actuator in a locked position.

FIG. 1 illustrates a front perspective view of a linear actuator 100 incorporating aspects of the disclosed embodiments. The actuator 100 has an outer housing 104 and an output ram 108 (also herein referred to as a "linear output member"). FIG. 2 illustrates the output ram 108, which is capable of axial motion (depicted by direction arrow X) into and out of the housing 104, such as from a retracted position as shown in FIG. 1. As a non-limiting example, the ram 108 may be attached to a door, panel, or engine thrust reverser, while the housing 104 is attached to a frame of a larger object, such as, but not limited to, an airplane. Movement of the ram 108 thereby determines position of the door, panel, or thrust reverser or other attaching surface. When the ram 108 is retracted into the housing 104, it may be locked to prevent inadvertent or unintended extension of the ram 108 from the housing 104. The aspects of the disclosed embodiments provide a rotary lock mechanism for the linear actuator 100. FIG. 2 illustrates a rotary lock mechanism 112 includes axially fixed lock keys that are displaced radially by grooves in the lock rotor 116 to engage a radial groove in the output ram 108, thereby locking and preventing axial motion of the ram 108 from its retracted position. A Lock Ring 136 with internal grooves provides radial guidance for the lock keys. An unlocked position of the rotor allows the keys to disengage from the radial groove, while a locked position of the rotor engages and restrains the keys within the groove.

Figure 3:
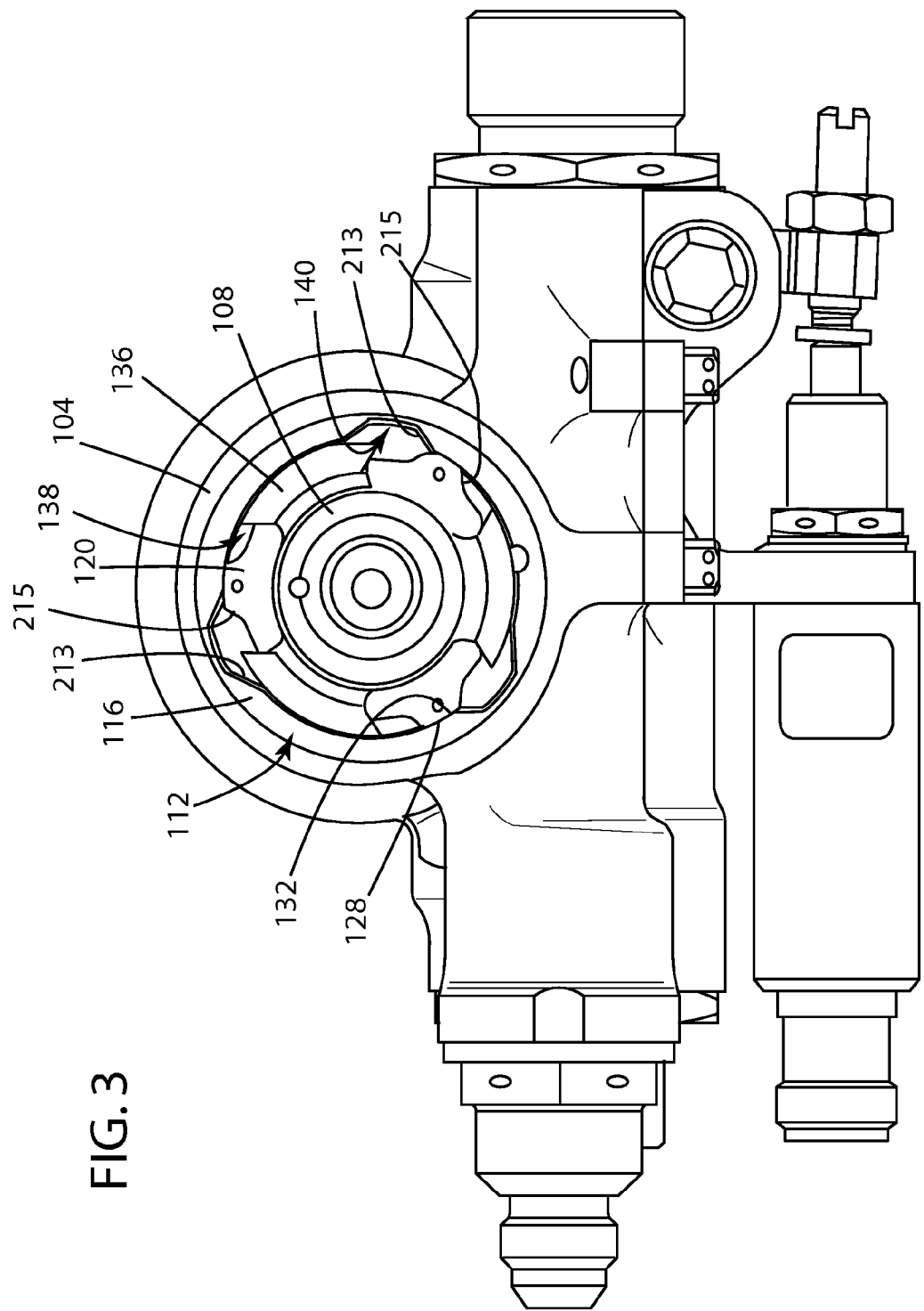
FIG. 3 depicts a cross section view of the linear actuator in FIG. 2 in accordance with an embodiment of the present disclosure.

FIGS. 2 and 3 depict cross section views of the actuator 100 with the ram 108 retained within the housing 104 in a locked position via a rotary lock assembly 112. In one embodiment, the rotary lock assembly 112 includes a rotor 116 and a lock key 120 (also herein referred to as a "lock"). The ram 108 includes a radial groove 124, into which lock key 120 may be disposed. Stated alternatively, while in the locked position, the lock key 120 engages the radial groove 124 of the ram 108 and prevents axial motion of the ram 108.

As shown in FIGS. 2 and 3, the rotor 116 is disposed coaxially with the ram 108, and includes a bore 128 having an inner radius that interfaces with a crown 132 of the lock key 120. A lock ring 136 is fixed to the housing 104 and includes grooves 138 that guide the lock keys 120 and restrict their displacement to radial motion, as will be described in further detail below. In an exemplary embodiment, an inside radius of the bore 128 will be approximately equal to an outside radius of the crown 132 when the lock key 120 is engaged with the radial groove 124. It will be appreciated that in response to the rotor 116 being disposed in the locked position of FIGS. 2 and 3, the bore 128 interfaces with the crown 132 of the lock key 120 and the lock key 120 is restrained from any outward radial motion (such as in direction Y in FIG. 2, for example). Therefore, the lock key 120 engages and is retained or held within, the groove 124 of the ram 108 by the rotor 116.

With reference to FIG. 2, in response to the engagement and retention of the lock key 120 within the groove 124, the ram 108 is axially locked. That is, motion of the ram 108, in response to any externally applied tension in the X (axial) direction to the right of FIG. 2, is prevented. In response to an external tension load applied to the ram 108 (attempting to pull thereupon without unlocking it first), the applied load is reacted through the ram 108, and is transferred to the lock keys 120 via groove 124. The lock keys 120 then react the applied tension load into the lock ring 136, which is a fixed element, and which, in turn, reacts the load into the housing 104. Therefore, the ram 108 remains securely locked within the housing 104 in response to application of external loading to the ram 108.

Figure 4:
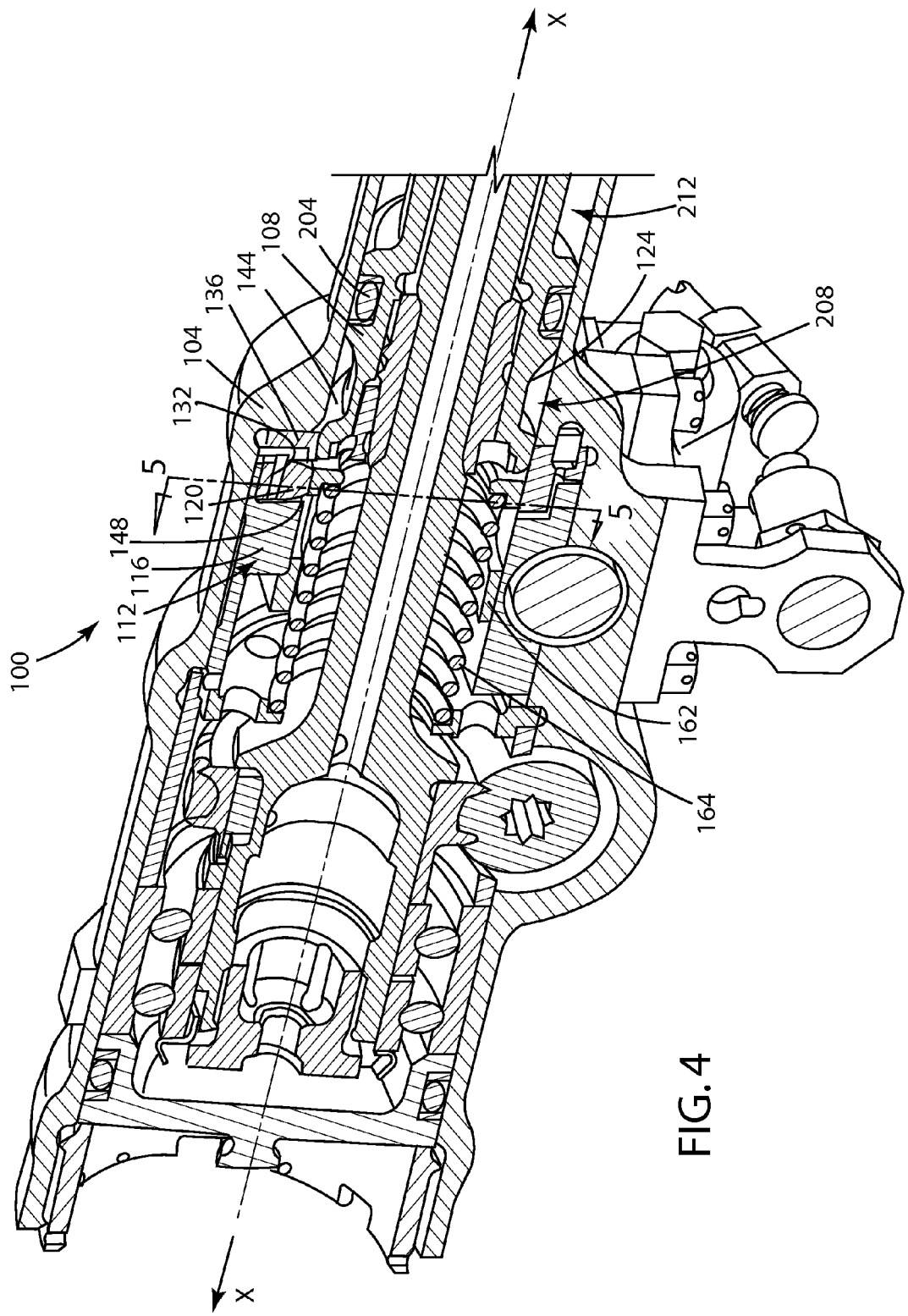
FIG. 4 depicts a front perspective cross section view of a linear actuator in an unlocked position.
Figure 5:
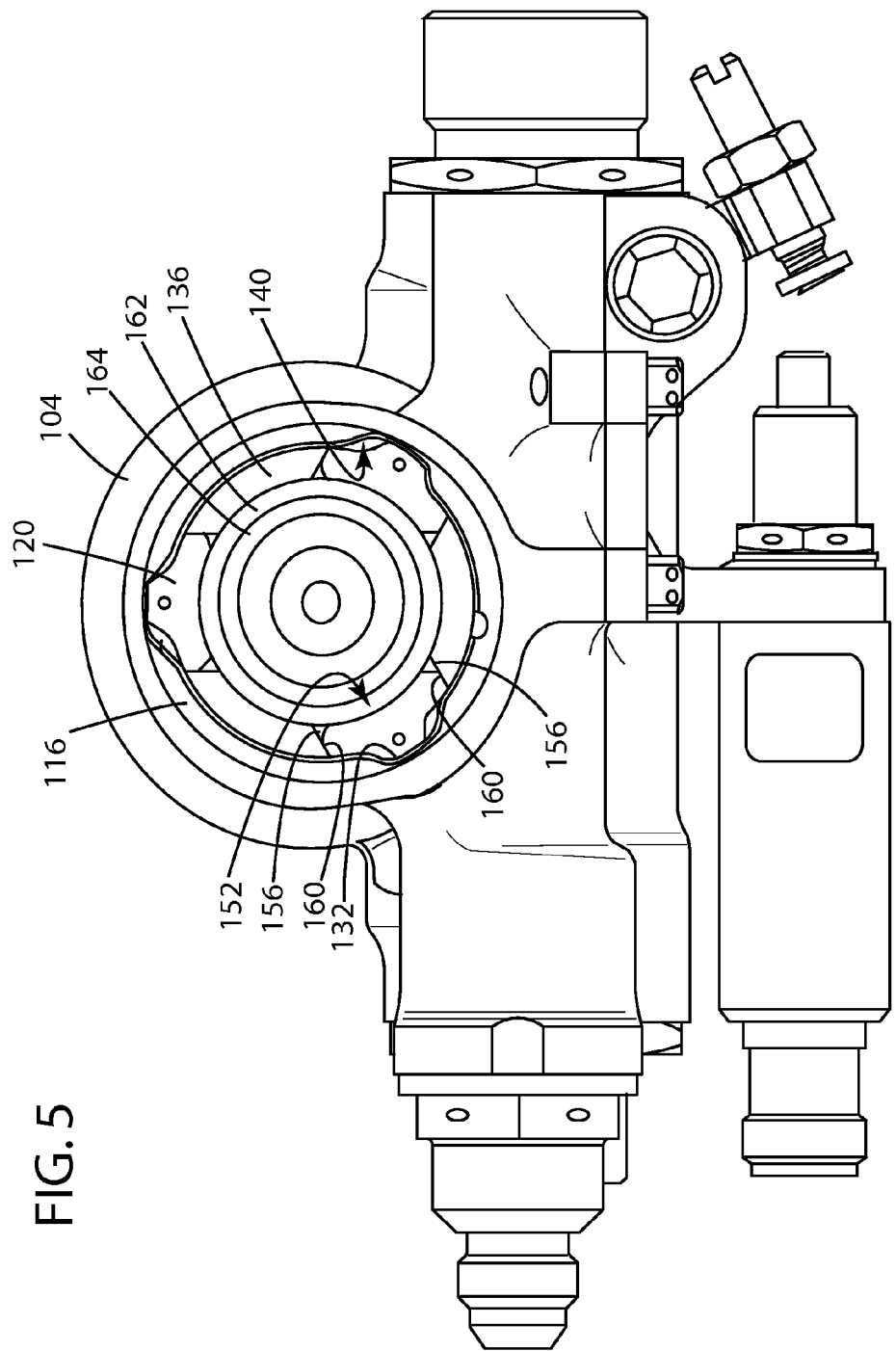
FIG. 5 depicts a cross section view of the linear actuator in FIG. 4 in accordance with an embodiment of the present disclosure.

FIGS. 4 and 5 depict cross section views of the actuator 100 with the rotor 116 in the unlocked position. Referring to FIGS. 3, 4, and 5, an example rotor 116 includes three axial grooves 140, or recesses into which the crown 132 of each lock key 120 may be disposed, as illustrated in FIGS. 4 and 5. Disposal of the rotor 116 in the unlocked position renders it capable of receiving the lock keys 120 within the grooves 140 and thereby defines an unlocked state. In the unlocked state, the ram 108 is capable of axial extension from the retracted position, out of the housing 104, such as to the right of FIG. 4, for example.

In an embodiment, an aft edge (toward the left of FIG. 4) of the radial groove 124 includes an axially angled surface 144 and an aft edge of the lock key 120 includes a corresponding axially angled surface 148 that is complementary to the surface 144 of the radial groove 124. The stationary lock ring 136 includes an opening 152 having two guidance surfaces 156 that engage with two surfaces 160 of the lock key 120. The guidance surfaces 156 (FIG. 5) of the lock ring 136 are designed with appropriate clearances between the surfaces 156, 160 such that motion of the lock key 120 is constrained to the radial direction. In response to the rotor 116 being in the unlocked position, the lock keys 120 are free to disengage from the groove 124. Motion of ram 108 in the axial direction, extending outward from the retracted position results in engagement of the angled surface 144 of the ram 108 with the angled surface 148 of the lock key. Because of the geometry of the angled surfaces 144, 148, a portion of the axial force accompanying motion of the ram 108 is resolved to a component that is directed radially outward upon the lock keys 120. In response to the radially outward directed force, and the constraint of the guidance surfaces 156, the lock keys 120 withdraw, or move radially outwards, to the unlocked position, into the grooves 140 of the rotor 116, as may best be seen in FIG. 5.

An embodiment of the disclosure may include a lock follower 162 that is of the same diameter of the ram 108 and is biased toward the direction of ram 108 extension by a spring 164. The lock follower 162 follows the ram 108 as it initially extends and radially retains the lock keys 120 in the withdrawn position as shown. This prevents the lock keys 120 from falling radially inward during or after extension of the ram 108, such as may otherwise occur in response to ambient vibration, for example.

Figure 6:
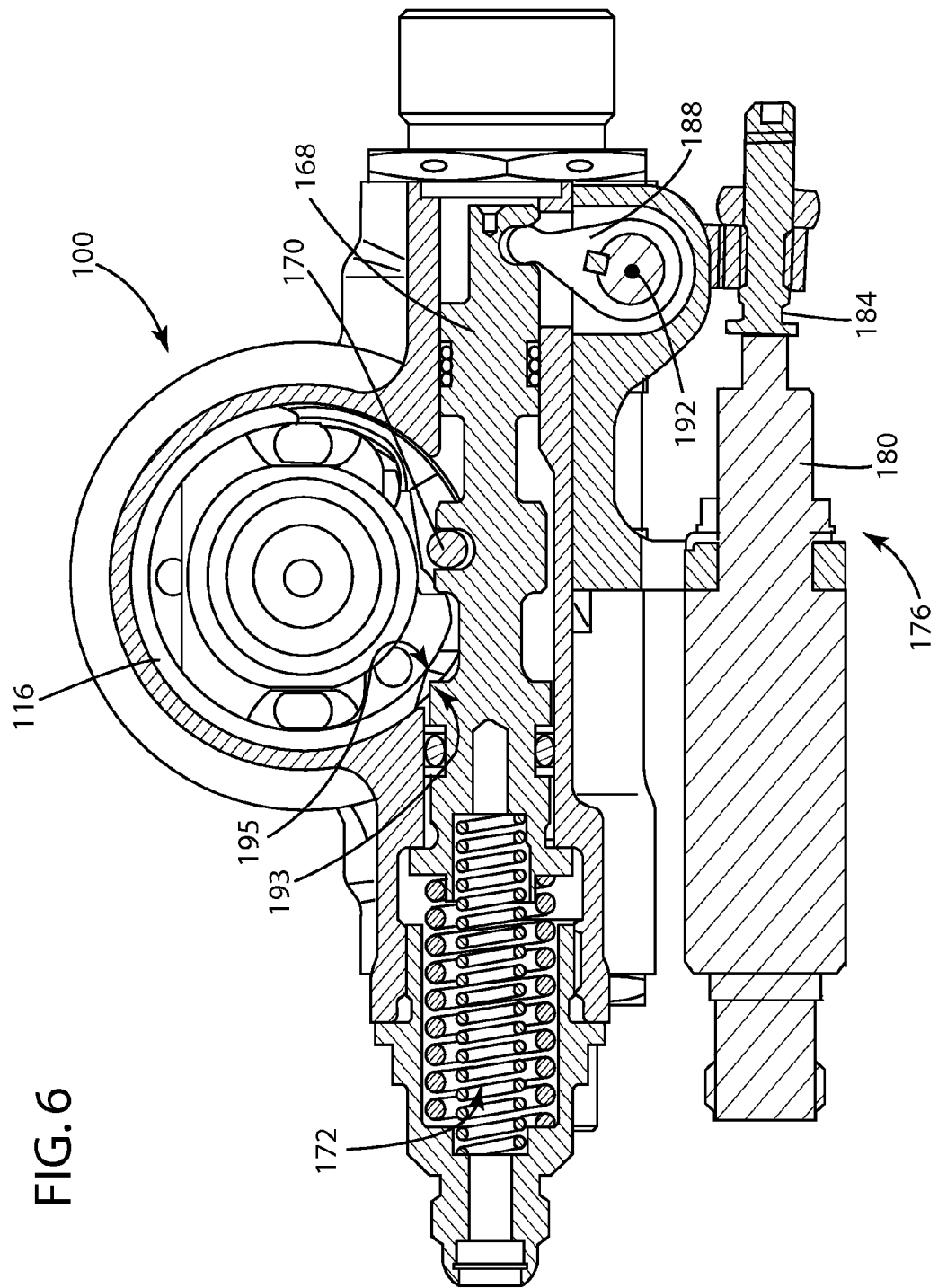
FIG. 6 depicts a cross section view of a linear actuator in a locked position in accordance with an embodiment of the present disclosure.
Figure 7:
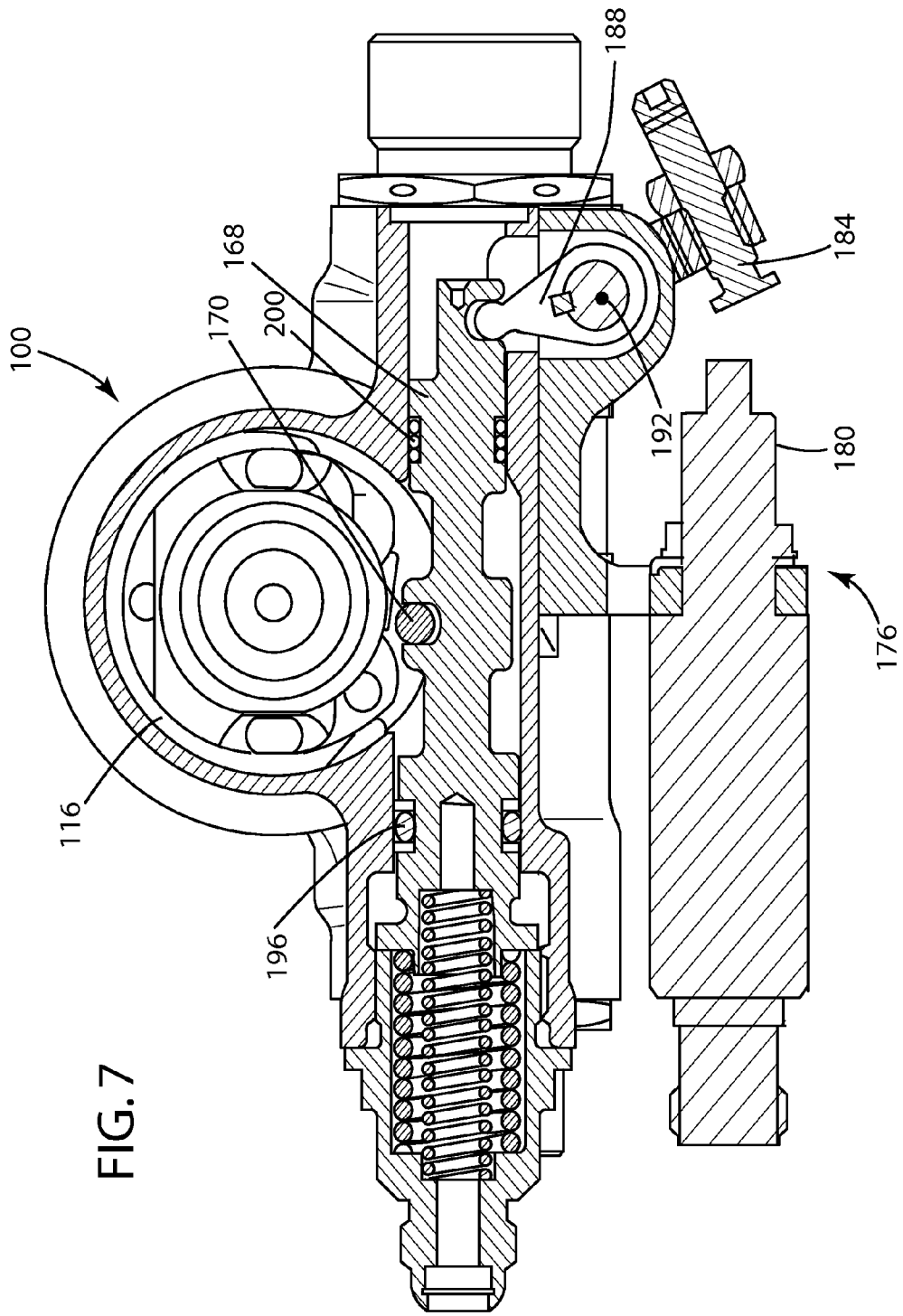
FIG. 7 depicts a cross section view of a linear actuator in an unlocked position in accordance with an embodiment of the present disclosure.

In one embodiment, the rotor 116 may be controlled and activated via a linear piston, such as a hydraulic or pneumatic piston, for example. FIGS. 6 and 7 depict cross section views of an actuator 100 having a piston and corresponding to the rotor 116 being in a locked and unlocked state, respectively.

Referring to FIG. 6, a locking piston 168 is coupled to the rotor 116 via a pin 170. In one embodiment, a nested spring arrangement 172 biases the locking piston 168 towards the right of FIG. 6, which corresponds to the locked position of the rotor 116. This spring force bias assures that the lock rotor 116 remains in the locked position in the absence of any external force, such as hydraulic or pneumatic pressure, as will be described in further detail below.

An embodiment may also include a status indicator 176 to provide remote indication whether the rotor 116 is in the locked or unlocked position. The status indicator includes a switch 180, a target 184, and a lock arm 188. The lock arm 188 is coupled to the piston 168 and is responsive to piston 168 motion about pivot 192. As depicted in FIG. 6, in response to the rotor 116 being in the locked position, the lock arm 188 is positioned such that target 184 contacts switch 180, thus indicating that the rotor 116 is in the locked position.

An embodiment may include an additional interface, also known as a "catch" between the rotor 116 and the piston 168. An example of the catch may include a shoulder 193 on the piston 168 designed to interface with a groove 195 of the rotor 116. The catch is designed such that should the pin 170 break, the rotor 116 cannot independently rotate or "walk away", from the locked position to the unlocked position due to vibration. In the absence of such a catch, a failure of the pin 170 (such as a broken pin, for example) could allow the switch 180 to indicate that the rotor 116 is in a locked position although it is actually in the unlocked position.

FIG. 7 depicts the piston 168, and thus the rotor 116, in the unlocked position. With reference back to FIG. 6, it will be appreciated that the piston 168 has shifted to the left, therefore causing the rotor 116, via pin 170, to rotate clockwise to the unlocked position. Motion of the piston 168 from the locked position to the unlocked position causes the lock arm 188 to rotate counterclockwise about pivot 192 and therefore disengage the target 184 from the switch 180. The switch 180 thereby indicates that the rotor 116 is in the unlocked position.

In an embodiment, the piston 168 may include two dynamic seals 196, 200 (FIG. 7). Displacement from the locked position to the unlocked position may be accomplished via application of hydraulic or pneumatic pressure between the two dynamic seals 196, 200. If dynamic seal 196 is designed larger than dynamic seal 200, as depicted, the differential area between the seals 196, 200 creates a force that causes the piston to move to the left. This movement of the piston 168 compresses the spring arrangement 172 (FIG. 6), and the pin 170 that engages the rotor 116 moves to the left, thus turning the rotor 116 clockwise to the unlocked position.

In an embodiment, the ram 108 may be actuated via pressure, such as hydraulic or pneumatic pressure, for example. With reference back to FIGS. 2 and 4, the ram 108 may include a dynamic seal 204, and the actuator 100 may include appropriate controls to apply pressure to either an extend side 208 or a retract side 212 (shown to the left and right, respectively, of FIGS. 2 and 4) of the dynamic seal 204. The extend side 208 of the ram 108 dynamic seal 204 may share porting with the lock piston 168, such that application of pressure to the extend side 208 simultaneously applies pressure between the dynamic seals 196, 200 of the lock piston 168. In this manner, unlocking and extension of the ram 108 may be accomplished via a single application of pressure. For example, in response to application of pressure to the extend side 208 of the ram 108 dynamic seal 204, the lock piston 168 will be displaced from the locked position (to which it is biased by spring arrangement 172) to the unlocked position, thereby rotating the rotor 116 to the unlocked position. A portion of the axial force upon the ram 108, exerted by application of pressure to the extend side 208 of the ram 108, will be resolved by the angled surfaces 144, 148 to exert an outward radial force upon the lock keys 120, which will be displaced into the axial grooves 140 of the rotor bore 128, thereby allowing displacement of the ram 108 from the retracted position within housing 104. The lock follower 162 follows the ram 108, and thereby holds the lock keys 120 in their withdrawn position within the grooves 140.

Following completion of the extension cycle, to retract the ram 108 and re-lock rotor 116, the extend side 208 of the dynamic seal 204 is depressurized, and pressure is applied to the retract side 212 of the dynamic seal 204. Therefore, pressure is present on the right side of the dynamic seal 204. The ram 108 then retracts and pushes the lock follower 162 out of the way (to the left of FIGS. 2 and 4). With the lock follower out of the way and the ram 108 in the retracted position, the lock keys 120 are aligned with the radial groove 124 in the ram 108. The spring arrangement 172 acts to push the lock piston 168 to the right (see FIGS. 6 and 7), causing the rotor 116 to rotate counterclockwise. Radially angled surfaces 213 of the groove 140 interface with the radially angled surfaces 215 (see FIG. 3) of the lock keys 120 proximate the crown 132 of the lock keys 120 to resolve a portion of the rotary force into inwardly directed radial force and shift, or displace the lock keys 120 into the radial groove 124 of the ram 108. As shown in FIG. 3, radially angled surfaces 213 of the grooves 140 and radially angled surfaces 215 of the lock keys 120 may be substantially planar and have angles complementary to one another. The rotor 116 continues rotating counterclockwise until the inner radius of rotor bore 128 rotates over the crown 132 of the lock keys, thus causing the ram 108 to be securely retained in the locked position. As shown in FIG. 5, the crowns 132 of the lock keys 120 may have a rounded outer surface with a radius of curvature substantially the same as a radius of curvature of an inner surface of the rotor 116.

In an embodiment, it may be desirable to synchronize the motion of multiple actuators 100. With reference to FIG. 2, the actuator 100 may include a synchronization arrangement such as a ball nut 216, a ball screw 220, a worm gear 224, and a worm 228 having a coupling 232, for example. The ball nut 216 is coupled to, or fixed within the ram 108, such that it travels axially with the ram 108 as it either extends or retracts. The ball nut 216 is also engaged with the ball screw 220 in a fashion that would readily be appreciated by one of skill in the art, such the ball screw 220 is responsive to axial motion of the ball nut 216 to rotate abut the center axis X. The worm gear 224 is fixed to the ball screw 220 and therefore rotates as the ball screw 220 rotates (an arrangement known in the art as a "back-driving worm gear"). The worm gear 224 engages a worm 228 in a fashion that would readily be appreciated by one of skill in the art and is responsive to rotation of the worm gear 224 to rotate about the center of the worm 228. The coupling 232 (depicted in FIG. 2 as a star configuration) provides an external link of the depicted actuator 100 to similar couplings of other actuators, thereby providing a mechanical, synchronizing link therebetween.

While embodiments of the disclosure have been depicted and described having pneumatic or hydraulic activation of the ram 108 and the rotor 116, it will be appreciated that the scope of the disclosure is not so limited, and may include other means of ram 108 and rotor 116 activation. For example, the pressurized system used to drive the ram 108 and the locking piston 168 may be replaced with a planetary (epicyclic) gear arrangement coupled to the ball screw 220 to drive the ram 108, as will be appreciated by one of skill in the art.

Figure 8:
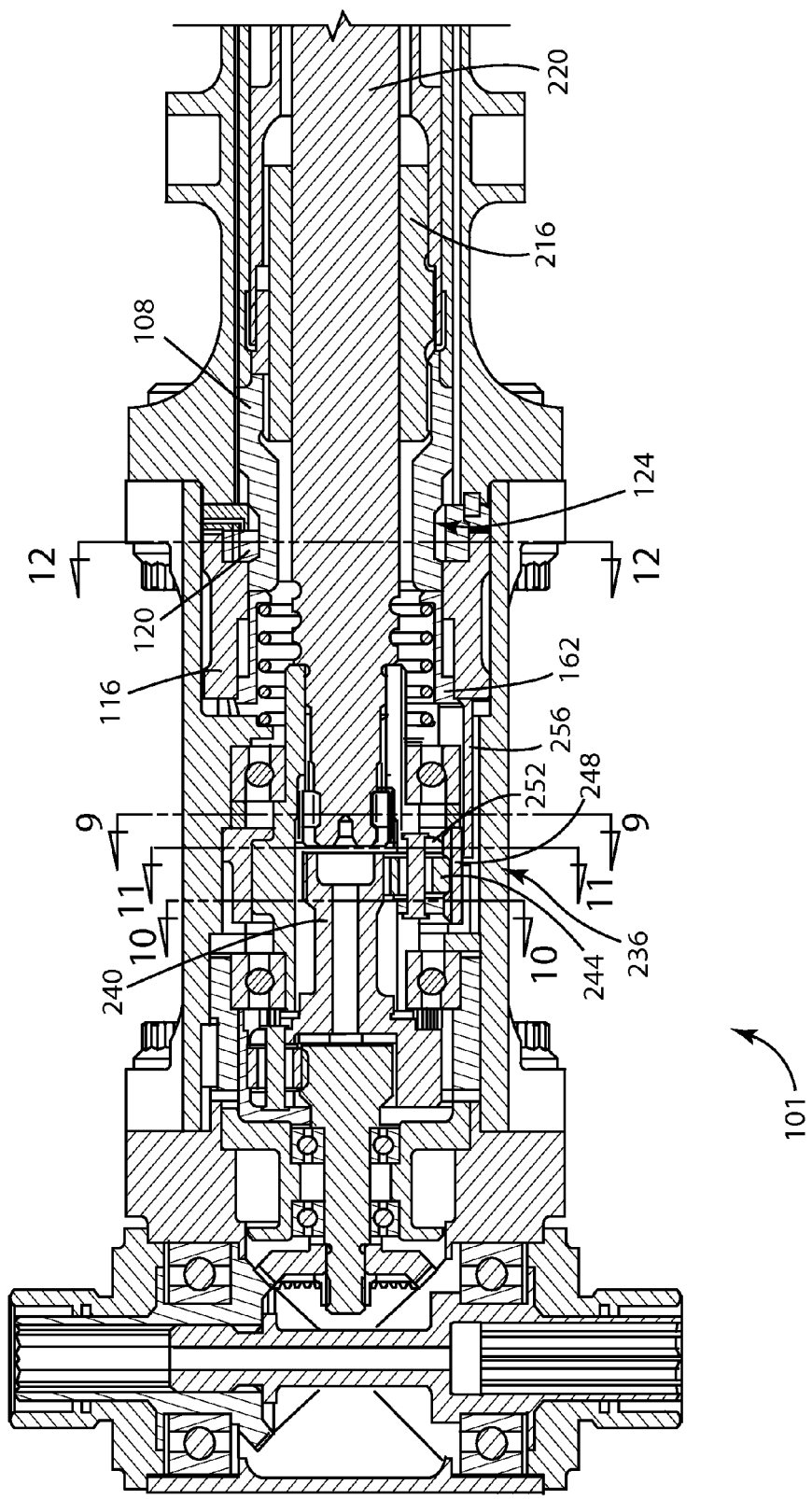
FIG. 8 depicts a cross section view of a linear actuator in accordance with an embodiment of the present disclosure.

FIG. 8 depicts an exemplary embodiment of a mechanical driven actuator 101. The mechanical actuator 101 includes an epicyclic gear arrangement 236 having a sun gear 240, planet gear 244, ring gear 248, and a planet carrier 252. The planet gear 244 is engaged with both the sun gear 240 and the ring gear 248. Because general operation of an epicyclic gear arrangement is understood within the art, a full description is not necessary here.

The sun gear 240 of the planetary gear arrangement 236 may provide the mechanical drive input to the gear arrangement 236 and the planet carrier 252 couples the ball screw 220 to the planet gear 244 to provide the energy to extend and retract the ram 108. An outer diameter of the ring gear 248 (annulus) of the planetary gear arrangement 236 may be nested in a bearing race and directly attached to the rotor 116 via a rotor extension 256. Therefore, it will be appreciated that in this embodiment, the ball screw 220 serves as the driver, and the ram 108 is responsive to the rotation of the ball screw 220 to move axially.

Figure 10:
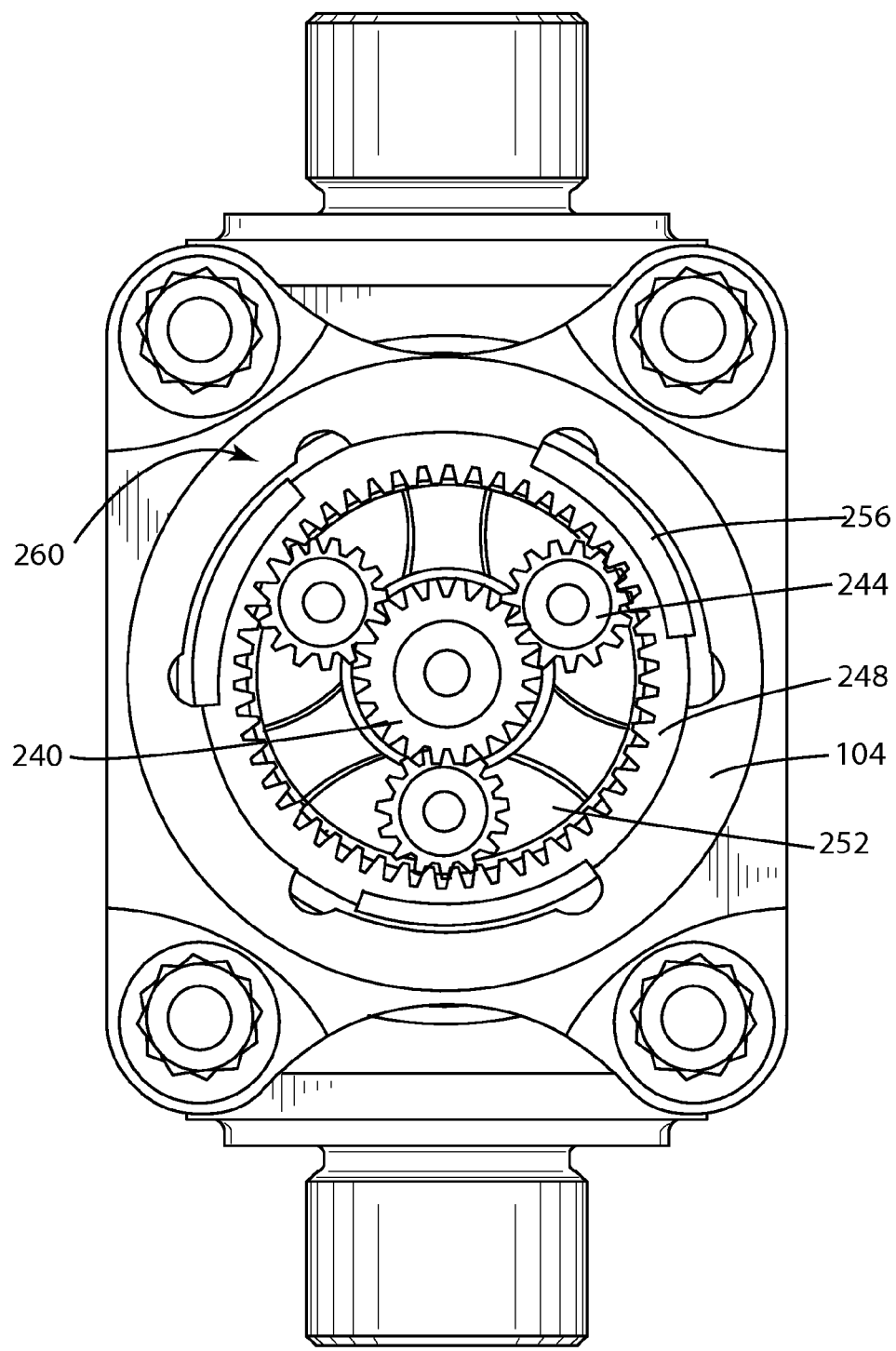
FIG. 10 depicts a cross section view of the linear actuator in FIG. 8 in accordance with an embodiment of the present disclosure.

In an exemplary embodiment, rotation of the rotor 116 to move to the unlocked position, may be provided by the planetary gear assembly 236 initially operating in what is known as a "Star" mode, during a lost motion stroke. With reference to FIG. 10, the rotor extension 256 (which is coupled to ring gear 248) acts as a key that engages a radial slot 260 that is equivalent to (and thereby defines) the rotation of the rotor 116 from the locked to unlocked position. In an embodiment, a torsion spring (analogous to spring assembly 172) may be included that directly biases the rotor 116 to the locked position.

Figure 9:
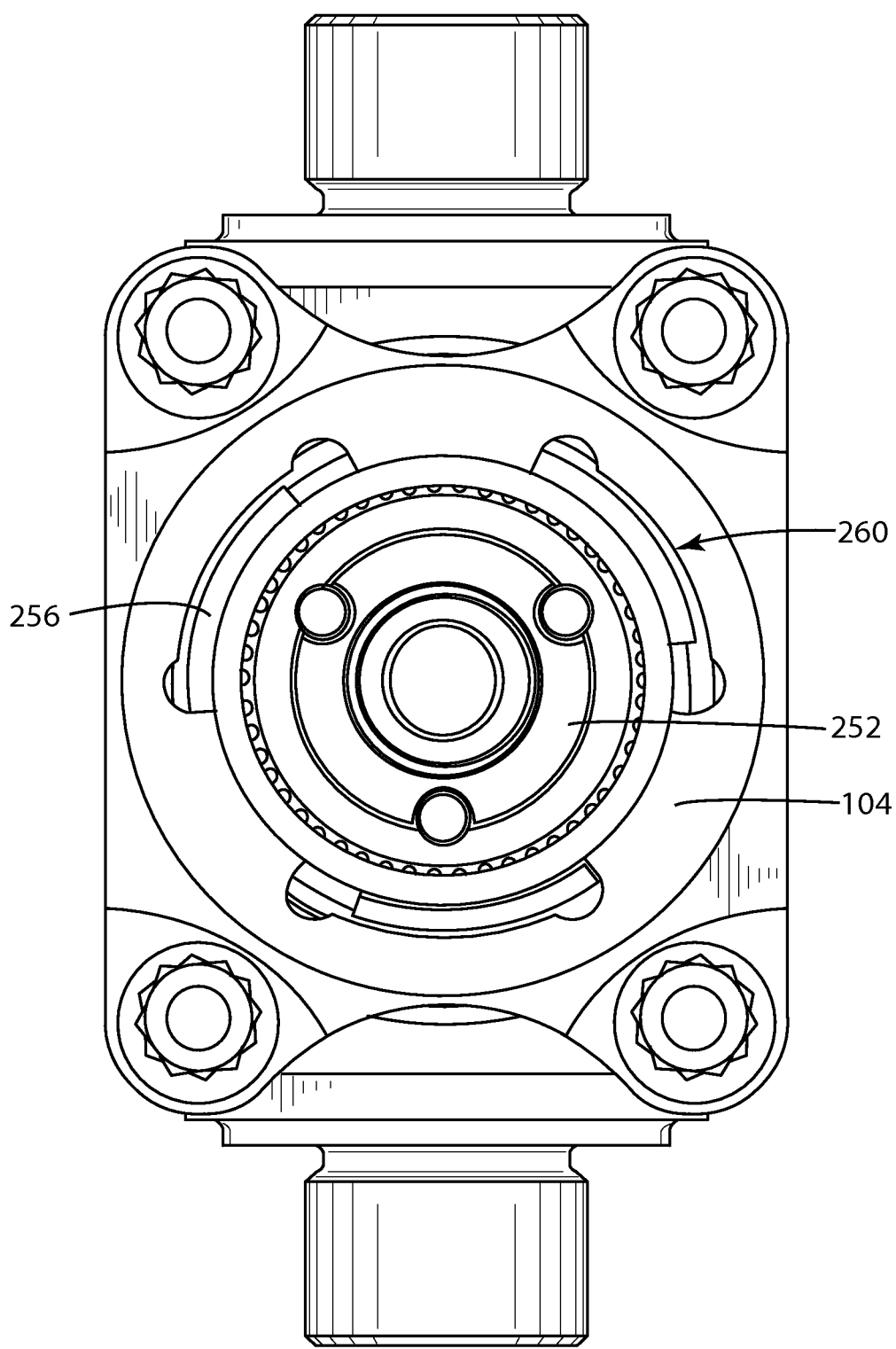
FIG. 9 depicts a cross section view of the linear actuator in FIG. 8 in accordance with an embodiment of the present disclosure.

Referring to FIGS. 8 and 9 together, to extend the ram 108, energy is input (such as via a motor, for example) to the sun gear 240. Because the ram 108 is constrained from any axial motion by the lock keys 120, the ball screw 220 cannot turn and advance the ram 108. Therefore, the carrier 252 is locked until the lost motion unlocks the lock keys 120. Therefore, the only response to the rotation input by the sun gear 240 is to rotate the ring gear 248, which is coupled to the rotor 116. The unlocking of the lock keys 120 in response to rotor 116 rotation mechanically coincides with the rotor extension 256 bottoming out in the slot 260 of the housing 104. Bottoming out of the extension 256 in the slot 260, and unlocking the lock keys 120, thereby results in locking the ring gear 248 and freeing the planet carrier 252 to allow the planet gear 244 to revolve around the sun gear 240. Thus, the planetary gear arrangement 236 changes from star mode (fixed planet carrier 252, free sun 240 and free annulus 248) to planetary mode (fixed annulus 248, free sun 240 and free planet carrier 252). In the planetary mode, the energy input to the sun gear 240 is used to cause the planet gear 244 to revolve around the sun gear 240, and drive the planet carrier 252, which, in turn drives the ball screw 220 and thereby, via ball nut 216, causes the ram 108 to move axially.

To retract the ram 108 and rotate the rotor 116 to the locked position, this process is reversed. The motor driving the sun gear 240 reverses direction. The ring gear 248 reverses the load direction and attempts to rotate the rotor 116 from the unlocked position to the locked position. However, the lock keys 120 are constrained in the withdrawn position within the grooves 140 of the rotor 116 by the lock follower 162, and thereby prevent any rotation of the rotor 116. This effectively locks the ring gear 248 (via rotor extensions 256), and defines the planetary mode. Therefore, the input rotation of the sun gear 240 is transferred to the carrier 252, which causes the ball screw 220 to rotate, and retract the ram 108.

In response to the ram 108 coming to the fully refracted position, the lock follower 162 is pushed out of the way (axially) by the ram 108 and the lock keys 120 are aligned with the radial groove 124 in the ram 108. In response to the ram 108 being fully retracted, and thus no longer capable of any further axial motion, the ball screw 220 (and thus planet carrier 252) is locked, and the planetary gear arrangement 236 transitions from planetary mode to star mode. This now allows the rotor 116 to rotate from the unlocked to the locked position, pushing the lock keys 120 radially inward into the groove 124 via the interfacing surfaces 213, 215 of the rotor 216 groove and lock crowns 132, respectively, thus re-locking the ram 108 as described herein.

It will be appreciated that the output rotation direction of the ring gear 248 and rotor 116 during the lost motion stroke (star mode) is opposite of that of the planet carrier 252 and ball screw 220 during extension of the ram 108 (planetary mode). This is a fundamental characteristic of epicyclic gears operated in both Star and Planetary modes. This lost motion feature results in a design that is self-locking and self-unlocking without any additional commands or signals required in addition to the drive torque.

Figure 11:
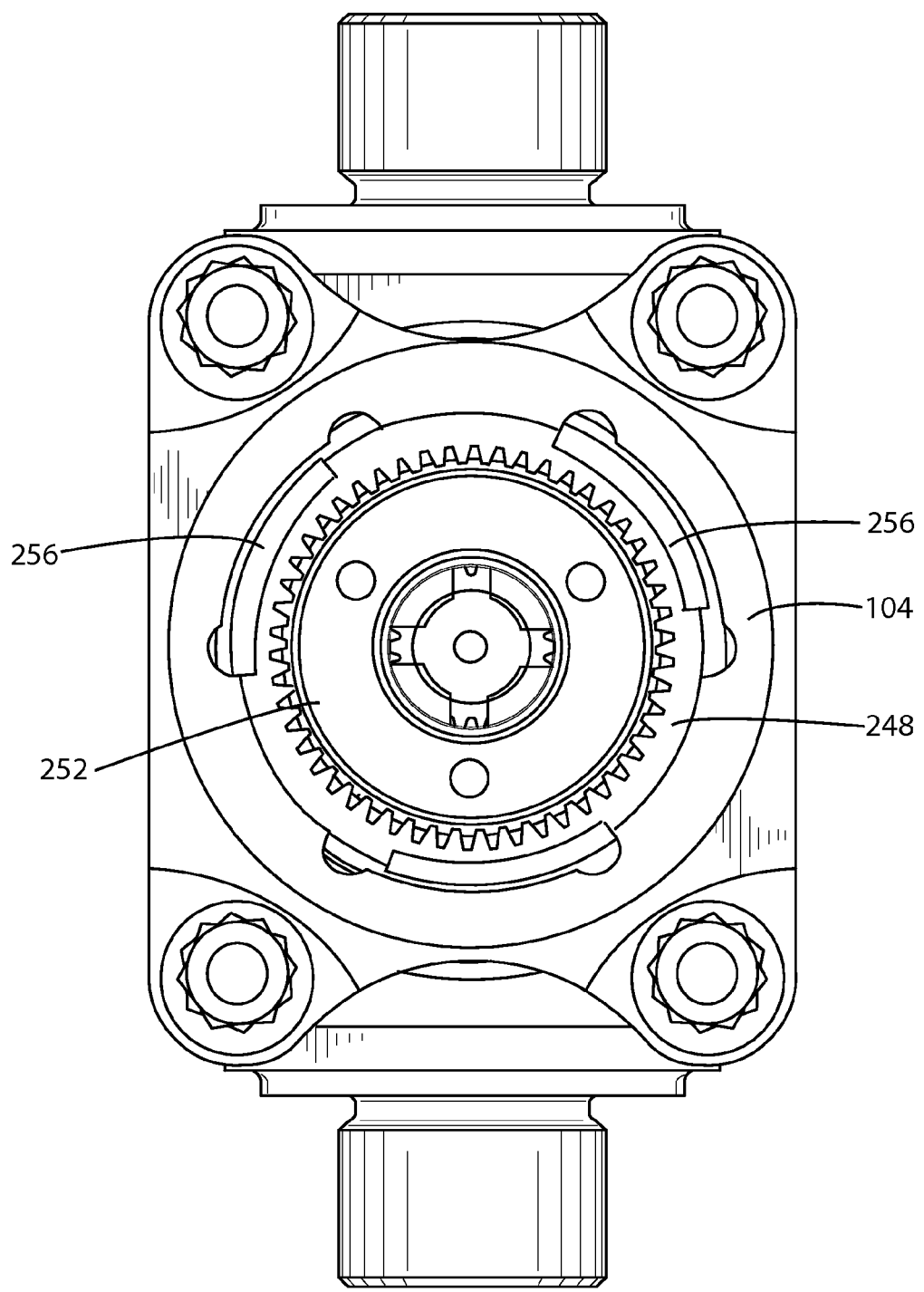
FIG. 11 depicts a cross section view of the linear actuator in FIG. 8 in accordance with an embodiment of the present disclosure.
Figure 12:
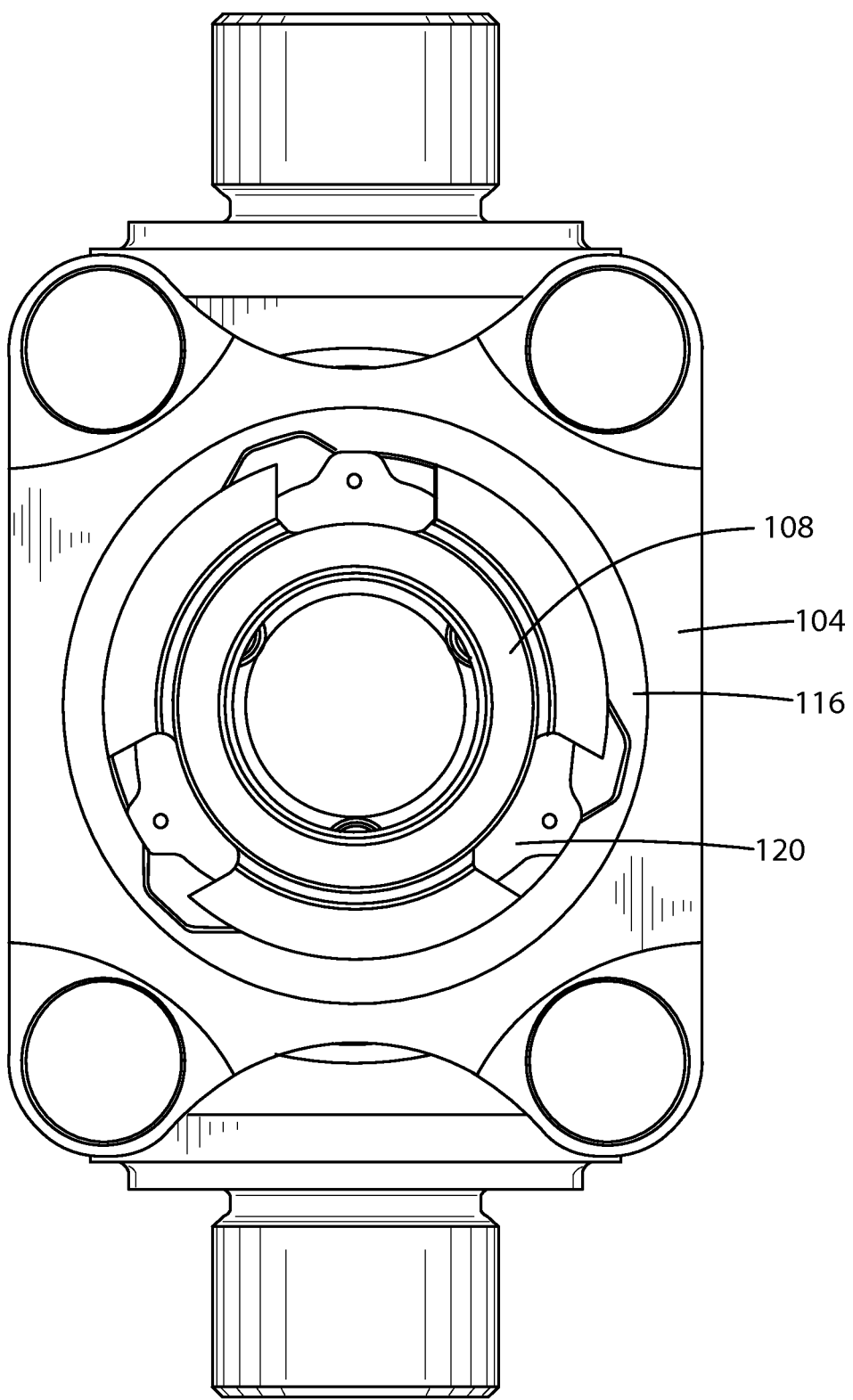
FIG. 12 depicts a cross section view of the linear actuator in FIG. 8 in accordance with an embodiment of the present disclosure.

To increase clarity, additional cross sectional figures of the actuator 101 as described herein and shown in FIG. 8 are provided. FIG. 10 depicts a cross section view of the planetary arrangement 236 shown in FIG. 8 including the sun gear 240, planet gear 244, ring gear 248, and planet carrier 252. FIG. 11 depicts a cross section view of the planetary arrangement 236 shown in FIG. 8 including the ring gear 248, planet carrier 252, and rotor extension 256. FIG. 12 depicts a cross section view of the rotor 116 with lock keys 120 in the locked position.

Figure 13:
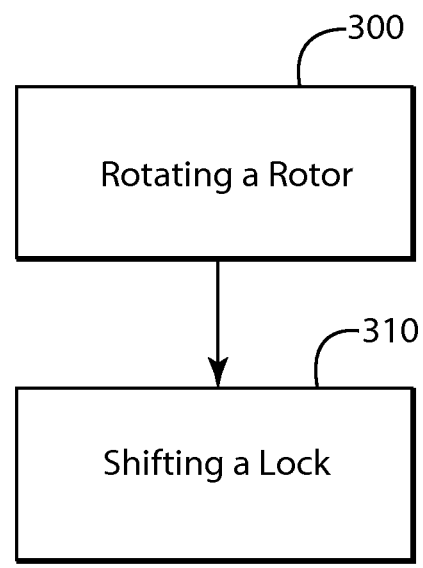
FIG. 13 depicts a flowchart of process steps for locking a ram of a linear actuator in accordance with an embodiment of the present disclosure.

In view of the foregoing, FIG. 13 depicts a flowchart of exemplary process steps of a method for locking a linear output member of a linear actuator, such as locking the ram 108 in a retracted position within the actuator 100, for example. Process step 300 includes rotating the rotor 116, disposed within the rotary lock assembly 112 of the actuator 100 to a first, locked rotor position, the rotary lock assembly 112 being constrained from axial motion within the housing 104 of the actuator 100.

In response to rotating the rotor 116 to the first, locked position, process step 310 includes shifting the lock key 120 within the rotary lock assembly 112 to engage the radial groove 124 of the ram 108. It will be further appreciated that in response to rotating the rotor 116 to the first, locked rotor position, the lock key 120 is restrained within the radial groove 124 of the ram 108 by the inner radius of the rotor bore 128. The process may further include rotating the rotor 116 to the second, unlocked rotor position, and thereby providing the clearance and degree of freedom for the lock keys 120 to shift radially outward into the axial groove 140, allowing the lock keys to disengage from the radial groove 124. Because of the interfacing surfaces 144, 148, axial motion of the ram 108 from the retracted position results in resolving some axial force into a radial force component to disengage the lock keys 120 from the radial groove of the ram 108.

As disclosed, some embodiments of the present disclosure may include advantages such as: an ability to provide robust, direct locking of the ram using a single piece housing having reduced overall size in at least one of length and diameter as well as mass; an ability to initiate locking and release of a linear ram without a separate electrical/hydraulic/pneumatic and/or mechanical locking or unlocking command or signal; and, a simple locked load path to provide enhanced reliability.

While embodiments of the disclosure have been described having a rotor with three axial grooves, it will be appreciated that the scope of the disclosure is not so limited, and is contemplated to include rotors having other numbers of grooves that may include helical grooves, such as one, two, four, or more grooves, for example. Further, while embodiments of the disclosure have been described controlling the rotor via a linear piston, it will be appreciated that the scope of the disclosure is not so limited, and is contemplated to include pistons that may be controlled via alternate means, such as linear motors or solenoids, for example. Additionally, while embodiments of the disclosure have been described with a coupling having a star configuration, The coupling 232 (depicted in FIG. 2 as a star configuration) it will be appreciated that the scope of the disclosure is not so limited, and is contemplated to include other means of torque transmission geometry, such as square, hexagonal, octagonal, TORX, etc, for example.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of locking a linear output member in a retracted position within a linear actuator, the linear output member capable of axial motion within a housing of the linear actuator, the method comprising:
   rotating a generally tubular rotor disposed within a rotary lock assembly of the actuator to a first rotor position, the rotary lock assembly being constrained from axial motion; and
   shifting a lock capable of radial displacement within the rotary lock assembly based on rotating the rotor to the first position such that the lock engages a radial groove of the linear output member when the linear output member is in a retracted position;
   wherein the radial groove of the linear output member includes an axially angled, substantially planar surface; and
   wherein the lock is configured to include an axially angled surface shaped complimentary to the axially angled, substantially planar surface of the radial groove.

2. The method of claim 1, further comprising:
   restraining the lock within the radial groove of the linear output member based on a substantial portion of the axially angled surface of the lock being in contact with a substantial portion of the axially aligned, substantially planar surface of the radial groove.

3. The method of claim 2, further comprising:
   rotating the rotor to a second rotor position; and
   allowing the lock to disengage the radial groove of the linear output member.

4. The method of claim 3, further comprising:
   moving the linear output member from the retracted position; and
   disengaging the lock from the radial groove of the linear output member.

5. The method of claim 4, wherein disengaging the lock from the radial groove of the linear output member further comprises resolving an axial force, accompanying moving the linear output member from the retracted position, to a component directed radially outwardly upon the lock such that the lock is thereby moveable radially outwardly from the radial groove.

6. The method of claim 4, wherein the rotor has an inner surface and an outer surface, the inner surface of the rotor including a plurality of axial rotor grooves, each axial rotor groove having a rounded surface with a radius of curvature defining an outer radius of the axial rotor groove and radially angled surfaces between the outer radius of the axial rotor groove and an innermost radius of the rotor; and
   wherein the lock is configured with a crown having a first portion and a second portion, the second portion extending radially outward from the first portion, the crown further configured with a radially angled surface between the first portion and the second portion, the radially angled surface having an angle complementary to an angle of one of the radially angled surfaces between the outer radius of the axial rotor groove and the innermost radius of the rotor; and
   wherein the one of the radially angled surfaces between the outer radius of the axial rotor groove and the innermost radius of the rotor is corresponding to and in substantial contact with the radially angled surface between the first portion and the second portion of the crown.

7. The method of claim 1, wherein rotating the rotor further comprises translating a piston capable of linear motion to a first piston position corresponding to the first rotor position, the piston being operatively connected to the rotor.

8. The method of claim 4, further comprising:
   returning the linear output member to the retracted position;
   returning the rotor to the first rotor position; and
   engaging the lock with the radial groove of the linear output member.

9. A method of locking a linear output member in a refracted position within a linear actuator, the linear output member capable of axial motion within a housing of the linear actuator, the method comprising:
   rotating a generally tubular rotor, having an inner surface having a radius of curvature, disposed within a rotary lock assembly of the actuator to a first rotor position, the rotary lock assembly being constrained from axial motion; and
   shifting a lock capable of radial displacement within the rotary lock assembly based on rotating the rotor to the first position such that the lock engages a radial groove of the linear output member when the linear output member is in a retracted position;
   restraining the lock within the radial groove of the linear output member based on a substantial portion of the axially angled surface of the lock being in contact with a substantial portion of the axially aligned, substantially planar surface of the radial groove;
   wherein the lock is configured with a crown extending radially outward, the crown having a rounded outer surface with a radius of curvature substantially the same as a radius of curvature of the inner surface of the rotor, wherein a substantial portion of the rounded outer surface of the crown corresponds to and contacts the inner surface of the rotor;
   wherein the radial groove of the linear output member includes an axially angled, substantially planar surface; and
   wherein the lock is configured to include an axially angled surface shaped complimentary to the axially angled, substantially planar surface of the radial groove.

* * * * *

UNITED STATES PATENT AND TRADEMARK OFFICE
CERTIFICATE OF CORRECTION

| | |
|---|---|
| PATENT NO. | : 8,932,176 B2 |
| APPLICATION NO. | : 14/174229 |
| DATED | : January 13, 2015 |
| INVENTOR(S) | : Joseph Thomas Kopecek |

It is certified that error appears in the above-identified patent and that said Letters Patent is hereby corrected as shown below:

In The Specification

Column 6, Line 40, please replace "abut" with -- about --

Column 7, Line 58, please replace "refracted" with -- retracted --

In The Claims

Column 10, Line 34, please replace "refracted" with -- retracted --

Signed and Sealed this
Twelfth Day of May, 2015

Michelle K. Lee
*Director of the United States Patent and Trademark Office*